United States Patent [19]

Schmidt et al.

[11] 4,063,861
[45] Dec. 20, 1977

[54] TIRE MOLD

[75] Inventors: Oskar Schmidt, Kittsee; Erich Grünner, Vienna; Horst Tompich; Gerhard Lenk, both of Kittsee; Adam Drum, Bruck, Leitha, all of Austria

[73] Assignee: Polyair Maschinebau GmbH, Kittsee, Austria

[21] Appl. No.: 669,666

[22] Filed: Mar. 23, 1976

[30] Foreign Application Priority Data

Mar. 24, 1975 Austria .................................. 2216

[51] Int. Cl.² .......................... B29F 1/00; B29H 5/02; B29H 17/00; B29C 5/04
[52] U.S. Cl. .................................. 425/542; 425/35; 425/54; 425/56; 425/57; 425/DIG. 44; 249/183; 249/184; 249/186
[58] Field of Search ............... 249/178, 179, 180, 184, 249/185, 186, 65, 37; 425/35, 49, 54, 50, 55, 56, 57, 52, 129, DIG. 43, DIG. 44, 142, 242 R

[56] References Cited

U.S. PATENT DOCUMENTS

| 1,101,732 | 6/1914 | Doughty | 425/50 X |
| 1,160,033 | 11/1915 | Ambrose | 249/37 |
| 1,370,101 | 3/1921 | Dykes | 425/55 X |
| 2,170,188 | 8/1939 | Cobi | 249/65 |
| 2,405,254 | 8/1946 | Hopkins | 249/180 |
| 2,763,317 | 9/1956 | Ostling et al. | 425/52 X |
| 3,248,756 | 5/1966 | Mills et al. | 249/180 X |
| 3,270,999 | 9/1966 | Fowler et al. | 425/DIG. 43 |
| 3,279,739 | 10/1966 | Long | 249/184 X |
| 3,358,330 | 12/1967 | Pacciarini et al. | 425/54 X |
| 3,474,493 | 10/1969 | Staples | 249/180 X |
| 3,645,655 | 2/1972 | Benege | 425/49 X |
| 3,784,338 | 1/1974 | Previati | 425/54 X |
| 3,813,197 | 5/1974 | Ray et al. | 249/180 X |
| 3,825,392 | 7/1974 | Ligon et al. | 249/184 X |
| 3,924,982 | 12/1975 | Yang et al. | 425/35 |

FOREIGN PATENT DOCUMENTS 4,530,590 10/1970 Japan .................................. 425/129

Primary Examiner—J. Howard Flint, Jr.
Attorney, Agent, or Firm—Karl F. Ross

[57] ABSTRACT

A casting or injection mold for vehicle tires comprises two separable half-shells together defining an annular cavity into which a segmented core is introduced, radially inwardly converging core segments alternating with parallel-sided or radially inwardly diverging core segments to facilitate extraction of the core from the molded tire. In operation, one or more of the non-converging segments are immobilized within the mold, with the aid of mating formations on these segments and on the two half-shells, while the converging segments are urged radially inwardly by resilient or fluidic forces. In a specific embodiment these forces are supplied by a contractile annular spring with projections received in axially extending undercuts of all the segments.

6 Claims, 4 Drawing Figures

TIRE MOLD

FIELD OF THE INVENTION

Our present invention relates to a casting or injection mold for a vehicular tire, made of elastomeric material such as polyurethane, in which two separate half-shells form an annular mold cavity whose inner boundary is defined by a core centered on the shell axis.

BACKGROUND OF THE INVENTION

In such a mold it is convenient to use a generally toroidal core peripherally divided into a number of ring segments to facilitate its extraction from the molded tire body after the same has been removed from the mold cavity. For this purpose it is necessary to have at least one segment whose sides are parallel to each other or diverge in a radially inward direction as seen from the shell axis. After this segment or segments have been extracted from the tire, the other segments can also be removed even if their sides converge in the direction of the axis.

Such a construction requires the several core segments to be precisely aligned in their working position and to be capable of resisting severe pressure differences. The maintenance of alignment can be accomplished, for example, with the aid of hook-shaped fittings overlappingly interlinking the segments in that position. In practice, however, the installation of such fittings requires a special machining of the contact surfaces of the ring segments, in order to preserve the necessary fluidtightness; the fittings, moreover, tend to interfere with the extraction of the segments from the molded tire body.

OBJECT OF THE INVENTION

The object of our present invention, therefore, is to provide an improved mold for the casting or injection-molding of a vehicular tire or the like in which the aforestated drawbacks are avoided.

SUMMARY OF THE INVENTION

In accordance with the present invention, the generally toroidal core of our improved mold is divided into an even number of segments, i.e. first segments with radially inwardly coveging sides alternating with second segments whose flanks extend nonconvergingly (i.e. parallel or divergingly) toward the axis, at least one of the half-shells of the mold and the second segments being provided with mating coupling formations for immobilizing the latter segment in a mold-closed position in which a radially inward biasing force, acting upon at least the first segments, maintains all the segments in firm contact with one another.

The biasing force may be exerted upon the last-mentioned segments by individual contractile links, such as tension springs or fluidically actuated jacks, secured to an annular anchor member which is centered on the core axis. An advantageous alternative to this arrangement includes a resiliently contractible ring removably engaging the segments which are to be inwardly biased.

BRIEF DESCRIPTION OF THE DRAWING

The above and other features of our invention will now be described in detail with reference to the accompanying drawing in which.

SPECIFIC DESCRIPTION

Figure 1:
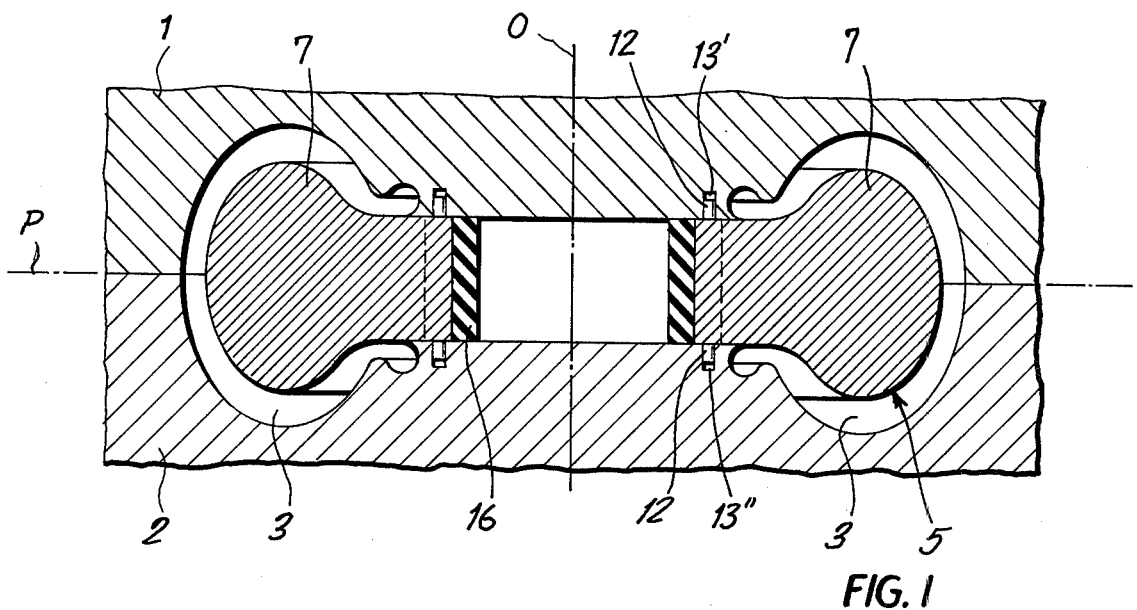
FIG. 1 is an axial sectional view of a tire mold embodying our invention.
Figure 2:
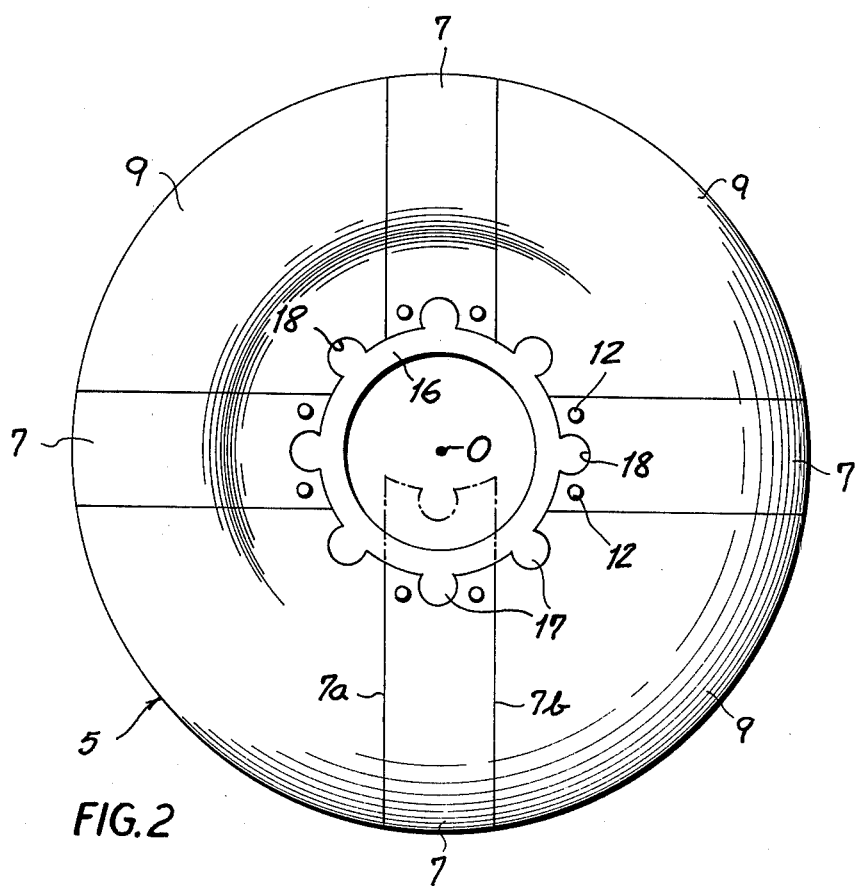
FIG. 2 is a plan view of a core used in the mold of FIG. 1.

In FIGS. 1 and 2 we have shown a tire mold comprising a pair of complementary half-shells 1 and 2 forming an annular mold cavity 3. The inner boundary of this cavity is defined by a generally toroidal core 5 consisting of an even number (here eight) of ring segments, i.e. first segments 9 alternating with second segments 7. The segments 9 are of substantially sectoral configuration with sides converging radially inwardly toward the mold axis O. The segments 7, on the other hand, have parallel flanks 7a, 7b, though these flanks could also diverge somewhat (like the corresponding segments 8 in FIGS. 3 and 4) in the inward direction. By virtue of this nonconverging configuration, successive segments 7 can be inwardly retracted (as indicated in phantom lines in FIG. 2) from the molded tire body after the half-shells 1 and 2 have been separated, in the usual manner, along their parting plane P. When each segment 7 has been thus removed from the tire body, the segments 9 can be similarly extracted.

In accordance with our present invention each segment 7 is provided with two pairs of oppositely pointing pins 12 projecting parallel to the mold axis from its transverse faces, these pins lying on a common radius with reference to axis O and being received in respective bores 13' and 13'' of mold halves 1 and 2. Thus, with the mold held closed by a nonillustrated clamping mechanism, the position of segments 7 is precisely fixed and their contact with the intervening segments 9 holds the latter in place. Proper positioning of segments 9, which do not have any coupling formations such as pins 12, is ensured not only by the fluid pressure prevailing in cavity 3 after the mold has been charged, via nonillustrated channels, but also by a biasing ring 16 with peripherally spaced retaining projections 17 received in complementary axially extending open-ended undercuts 18 of segments 7 and 9. Ring 16, tending to contract around the axis O, draws the segments 9 inwardly into precise alignment with their immobilized neighboring segments 7.

After the mold is reopened, the ring 16 can be slid out axially from the engaged segments to facilitate their extraction as described above.

Figure 3:
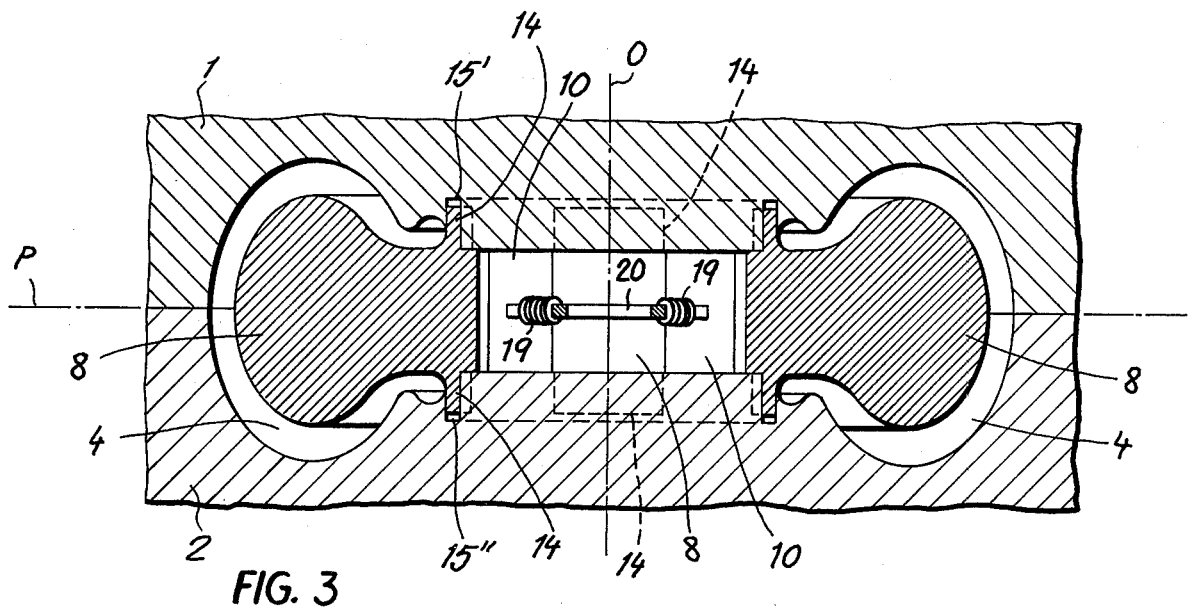
FIG. 3 is a view similar to FIG. 1, illustrating a modification.
Figure 4:
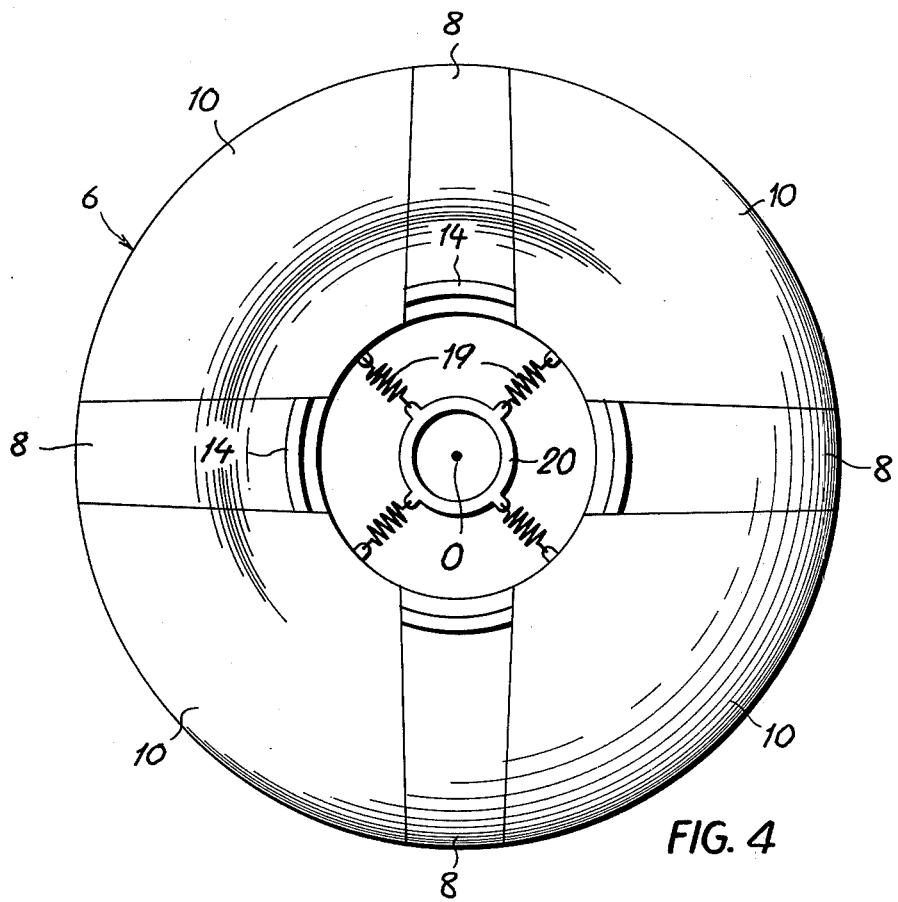
FIG. 4 is a plan view of a core used in the embodiment of FIG. 3.

In FIGS. 3 and 4 we have shown a modified arrangement wherein a core 6, defining with half-shells 1 and 2 a mold cavity 4, comprises first segments 10, generally similar to the converging segments 9 of FIGS. 1 and 2, alternating with radially inwardly diverging second segments 8 which are provided with arcuate webs 14 matingly projecting into respective ring channels 15' and 15'' of mold halves 1 and 2. In this case only the converging segments 10 are biased inwardly by respective tension springs 19 secured to a floating anchor ring 20 within the core 6. Segments 10 are free from any coupling formations such as webs 14.

The springs 19 could also be replaced by pneumatic or hydraulic jacks. They can be readily detached in order to facilitate successive extraction of segments 8 and 10.

Naturally, features of the two disclosed embodiments can be interchanged within the limits of compatibility.

Thus, for example, the segments 8 of FIGS. 3 and 4 may be provided with locator pins 12 rather than webs 14 to serve as coupling formations.

We claim:

1. In a mold for a vehicular tire or the like, comprising a pair of separable half-shells forming an annular mold cavity centered on an axis and a generally toroidal core receivable between said half-shells to define an inner boundary for said cavity, said core being peripherally divided into an even number of alternating first and second segments, said first segments having sides converging in a radially inward direction as seen from said axis, said second segments having flanks in contact with said sides extending nonconvergingly in said radially inward direction to facilitate extraction of all segments from the molded article, the improvement wherein said second segments and at least one of said half-shells are provided with mating coupling formations for immobilizing said second segments in a mold-closed position, at least said first segments being provided with biasing means exerting thereon a radially inward force in said mold-closed position for maintaining all said segments in firm contact with one another, said first segments being free from any coupling formations and being slidable with reference to said second segments and said half-shells in response to said inward force until coming to rest against the immobilized second segments in said mold-closed position.

2. The improvement defined in claim 1 wherein said biasing means comprises a resiliently contractile ring centered on said axis, said ring removably engaging at least said first segments.

3. The improvement defined in claim 2 wherein all said segments are provided with undercuts parallel to said axis, said ring being provided with retaining projections slibably received in said undercuts.

4. The improvement defined in claim 1 wherein said coupling formations include an annular groove on each of said half-shells and complementary arcuate webs on said second segments.

5. The improvement defined in claim 1 wherein said biasing means comprises an annular anchor member centered on said axis and contractile links extending radially between said anchor member and said first segments.

6. The improvement defined in claim 5 wherein said links are tension springs.

* * * * *